No. 690,283. Patented Dec. 31, 1901.
G. E. HEYL-DIA.
INSULATED ELECTRIC CABLE OR CONDUCTOR.
(Application filed July 11, 1900.)
(No Model.)
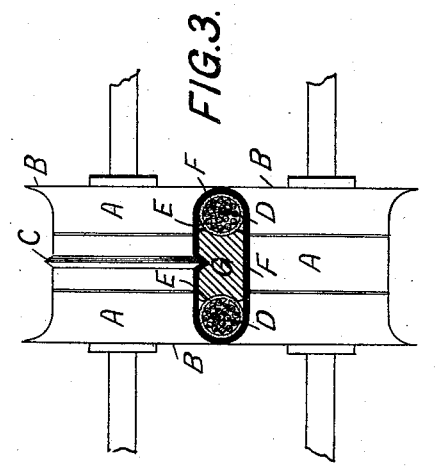
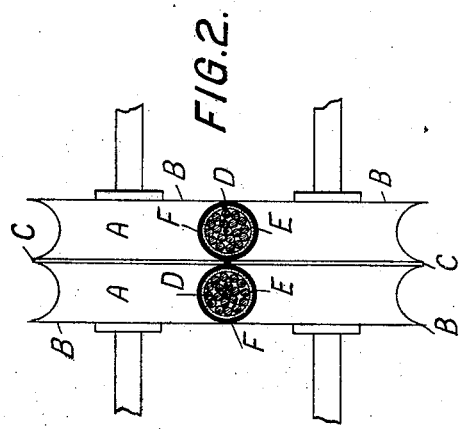
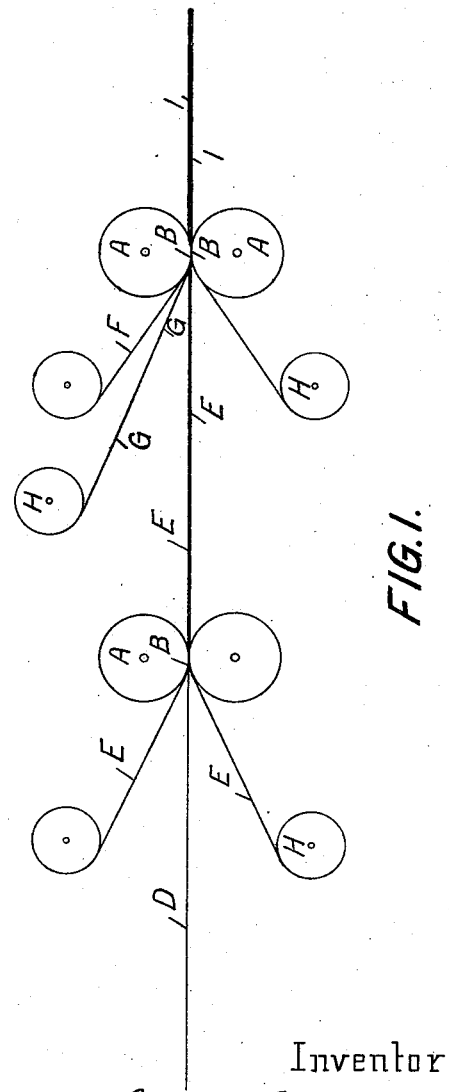
Witnesses
Inventor
George E. Heyl-Dia
by Henry Connett
Attorney

UNITED STATES PATENT OFFICE.

GEORGE EDWARD HEYL-DIA, OF MANCHESTER, ENGLAND.

INSULATED ELECTRIC CABLE OR CONDUCTOR.

SPECIFICATION forming part of Letters Patent No. 690,283, dated December 31, 1901.

Application filed July 11, 1900. Serial No. 23,239. (No model.)

*To all whom it may concern:*

Be it known that I, GEORGE EDWARD HEYL-DIA, a subject of the Queen of Great Britain and Ireland, and a resident of Higher Broughton, Manchester, in the county of Lancaster, England, (whose post-office address is 236 Gt. Clowes street, Higher Broughton, Manchester, England,) have invented certain new and useful Improvements in Insulated Electric Cables or Conductors, of which the following is a specification.

In the manufacture of twin wires for electric circuits the two wires have hitherto been covered separately, and then the two separately-covered wires have been embedded in or wrapped around with further insulating material, involving considerable extra expense. This is especially the case when the wires have to be covered with strips to be themselves nailed to walls, ceilings, and the like. The strips are hollowed out with two independent grooves to contain the two wires. Now by my invention I cover the two wires with insulation by the same operation, and also, when required, by the same operation insert between the wires a fillet or strip of permeable material through which the nails can be driven which attach the twin wires to the wall, ceiling, or the like.

At the present time wires are covered by a series of them being run between parallel grooved rollers, one wire in each groove, and on the top and the bottom of these wires a layer of india-rubber is placed and passes through the grooved rollers with the wires, the grooves being semicircular and of just sufficient diameter to allow the wire with the tightly-compressed covering of india-rubber to pass through them. When, therefore, the wires and the two rubber strips pass through, the edges of the grooves, meeting each other, cut the india-rubber and form a round tube of india-rubber around each wire. Now in carrying out my invention I slightly alter these grooved rollers. If I wish simply to have two wires connected together, I cut away every alternate edge between the grooves, so as to leave a slight flat. When the wires and the two webs of india-rubber are passed between these rollers, the india-rubber instead of being slit between each wire and the next is slit only between each alternate wire and the next, but is tightly compressed around the two wires, thus forming a twin wire. If three, four, five, or more wires are desired to be attached in a single band the cutting edges of the rolls between these wires are cut away. Where I wish a fillet between two wires, I unite three grooves of these rollers in one and pass the two wires, with the fillet between them, through the long groove thus formed, together with the two covering-webs of rubber. The rolls thus cover the fillet and the two wires with the tightly-adhering layer of india-rubber all around. It is obvious that in making fresh rolls it is not necessary to cut away the cutting edges, and the rolls can be spaced in any way that is desirable, so as to use a larger or smaller fillet; further, that the fillet can be nicked slightly in the center, so as to direct the points of the nails into the exact center of the fillet.

In order that my invention may be further understood, I append the accompanying drawings, in which—

Figure 1 is a diagrammatic sketch of the rolling device; Fig. 2, an enlarged section of the rolls as applied for making a simple twin, and Fig. 3 enlarged sectional rolls in my most improved design as applied to making conductors for electric-light wiring and the like.

In the drawings, A A are the rollers; B B, sharp cutting edges; C C, nicking edges or flats not cutting; D D, wires; E E, inner covering-strips; F F, outer covering-strips; G, fillet; H H, rolls carrying material; I, finished conductor.

I declare that what I claim is—

1. An electric conductor of the twin-wire or compound type, having a fillet of permeable material inserted centrally between the wires and within the insulating-covering of the wires, substantially as and for the purpose set forth.

2. An electric conductor of the twin-wire or compound type, comprising a plurality of conductors, a fillet of permeable material between adjacent conductors and an insulating-covering inclosing said conductors and fillet, substantially as described.

3. An electric conductor of the twin-wire or compound type, comprising a plurality of conductors, a fillet of permeable material between adjacent conductors and an insulating-covering inclosing said conductors and fillet, the insulating-covering and fillet having a central longitudinal nick, substantially as and for the purpose set forth.

In witness whereof I have hereunto signed my name this 26th day of June, 1900, in the presence of two subscribing witnesses.

GEORGE EDWARD HEYL-DIA.

Witnesses:
  A. F. STEVENSON,
  N. W. MEDLEY.